United States Patent [19]

Bolton et al.

[11] 4,447,875

[45] May 8, 1984

[54] REDUCTION PROCESSOR FOR EXECUTING PROGRAMS STORED AS TREELIKE GRAPHS EMPLOYING VARIABLE-FREE APPLICATIVE LANGUAGE CODES

[75] Inventors: Brent C. Bolton, Austin, Tex.; Carl F. Hagenmaier, Jr., Pittstown, N.J.; Gary L. Logsdon, Round Rock; Robert L. Miner, Jr., Austin, both of Tex.

[73] Assignee: Burroughs Corporation, Detroit, Mich.

[21] Appl. No.: 281,064

[22] Filed: Jul. 7, 1981

[51] Int. Cl.³ .............................................. G06F 7/00
[52] U.S. Cl. ................................................... 364/200
[58] Field of Search ... 364/200 MS File, 900 MS File

[56] References Cited

U.S. PATENT DOCUMENTS

| | | | |
|---|---|---|---|
| 3,343,135 | 9/1967 | Freiman et al. | 364/200 |
| 3,646,523 | 2/1972 | Berkling | 364/200 |
| 4,075,689 | 2/1978 | Berkling | 364/200 |
| 4,121,286 | 10/1978 | Venton et al. | 364/200 |
| 4,149,240 | 4/1979 | Misunas et al. | 364/200 |

OTHER PUBLICATIONS

1st International Conference on LISP and Functional Programming at Stanford; Skim-The S,K,I, Reduction Machine; by T. J. W. Clarke; Aug. 25-27, 1980.

Primary Examiner—Jerry Smith
Assistant Examiner—William G. Niessen
Attorney, Agent, or Firm—Mervyn L. Young; Kevin R. Peterson

[57] ABSTRACT

This disclosure relates to a reduction processor for the evaluation of one or more functions which are stored in memory in the form of a series of nodes of a treelike graph where the nodes implement a variable-free applicative language. The respective function operators are reduced through a progressive series of transformations or substitutions until a result is obtained. During the reduction process, the processor transfers nodes to and from memory and performs various operations as required on those nodes. The processor can also create new nodes in memory and delete unused ones.

12 Claims, 10 Drawing Figures

REDUCTION PROCESSOR FOR EXECUTING PROGRAMS STORED AS TREELIKE GRAPHS EMPLOYING VARIABLE-FREE APPLICATIVE LANGUAGE CODES

RELATED U.S. PATENT APPLICATIONS

U.S. patent applications directly or indirectly related to the subject application are the following:

Ser. No.: 281,065, filed 7/7/81 by Carl F. Hagenmaier, Jr. et al and entitled A Concurrent Network of Reduction Processors for Executing Programs Stored as Treelike Graphs Employing Variable-Free Applicative Language Codes.

BACKGROUND OF THE INVENTION

1. Field of the Invention

This invention relates to a digital processor which is adapted to execute programs employing abstracted applicative language code, and more particularly to such a processor which reduces higher order functions by progressive substitutions of equivalent expressions.

2. Description of the Prior Art

Most digital computers on the market today are still of the type first postulated by John von Neumann and are sequential in their execution of commands. In programming such computers, the programmer has the responsibility for specifying storage management as well as control-flow management and the design of the algorithm to be implemented by the computer. The first higher level languages for programming computers were imperative in nature in that they called for a sequence of commands to be implemented in an iterative fashion. A particular attempt at introducing parallelism into a program execution has been in the creation of data-flow or data-driven systems. See, for example, Barton et al U.S. Pat. No. 3,978,452. However, such systems were still designed to execute programs written in imperative languages which do not readily accommodate a high degree of parallelism.

Pure applicative program languages, such as pure LISP, differ from the more conventional imperative languages, such as FORTRAN and COBOL, in that the latter specify a sequence of steps to be carried out in a particular order while the former do not. Applicative languages generally are based on the lambda calculus of A. Church and are very concise. However, they do not provide for storage and are not history sensitive. Thus, practical implementations of such languages as LISP take on may iterative features and the programmer is still responsible for control-flow sequencing as well as the basic algorithm design (cf., J. McCarthy et al, LISP 1.5 Programmers' Manual, M.I.T. Press, 1962).

A particular applicative language as a readable alternative to pure LISP is the Saint Andrews Static Language, or SASL, which was proposed by David A. Turner (*SASL Language Manual*, University of St. Andrews, 1976). This language can be implemented by employing a number of "combinators" and also primitive functions to transform SASL source code into a notation in which bound variables do not occur to produce a variable-free object code, (D. A. Turner, "A New Implementation Technique for Applicative Languages", *Software—Practice and Experience*, Vol. 9, pp. 31–49, 1979). This language is particularly advantageous for handling higher order functions, including nested functions and non-strict functions in which an answer may be returned even though one of its arguments is undefined. Thus, when a particular combinator is encountered, it can be reduced or evaluated by progressive substitutions of equivalent expressions. As a result, two-cell nodes may be stored in memory as a treelike graph where some cells specify either a function such as a combinator or a primitive function and other cells specify a value or pointers or addresses to other cells. A node may contain both a function and a value.

Such programs may be said to be demand-driven in that only those functions are evaluated as are necessary and the language is completely concurrent in that the respective functions can be evaluated independently of one another subject to the constraint that, for a given graph, some functions may terminate and others may not. Thus, such programs may be executed by a network of reduction processors operating either simultaneously or independently of one another. In this manner the programmer is relieved of both storage management responsibilities as well as the responsibilities for the control-flow management.

It is, then, an object of the present invention to provide an improved digital processor in which storage management and control-flow management are automatic.

It is another object of the present invention to provide an improved digital processor for executing applicative-type language codes from which bound variables have been removed.

Still a further object of the present invention is to provide an improved digital processor for reduction of higher order functions stored in memory as treelike graphs.

SUMMARY OF THE INVENTION

In order to accomplish the above-identified objects, the present invention resides in a digital processor and a memory wherein a plurality of functions to be evaluated are stored in the form of a series of nodes to form treelike graphs and wherein the digital processor is adapted to evaluate the various nodes through a series of progressive substitutions so as to implement an applicative language from which all bound variables have been removed.

A feature then of the present invention resides in a reduction processor for evaluating various nodes of a treelike graph which implement applicative language functions stored in memory.

BRIEF DESCRIPTION OF THE DRAWINGS

The above and other objects, advantages and features of the present invention may become readily apparent from a review of the following specification when taken in conjunction with the drawings wherein.

GENERAL DESCRIPTION OF THE INVENTION

The implementation technique proposed by Turner (supra) employs a set of operators which may be either primitive functions such as add, subtract, and so forth, or combinators S, K, I, and so forth, which are higher order non-strict functions in the sense that they can return a result even though one or more of their arguments is not defined. These combinators are formally defined by substitution rules as follows:

$$
\begin{aligned}
S\,f\,g\,x &= f\,x\,(g\,x) \\
K\,x\,y &= x \\
Y\,h &= h\,(Y\,h) \\
C\,f\,g\,x &= (f\,x)\,g \\
B\,f\,g\,x &= f\,(g\,x) \\
I\,x &= x \\
U\,f\,(P\,x\,y) &= f\,x\,y \\
\text{cond true } x\,y &= x \\
\text{cond false } x\,y &= y \\
\text{plus } m\,n &= m + n
\end{aligned}
$$
where m,n must already have been reduced to numbers.

The S combinator, when applied to two functions, f and g, of a single argument x, results in the function f(x) being applied to g(x); the K combinator, when applied to one argument as a function of a second argument, results in the first argument. The I combinator is an identity combinator. In addition, other combinators are postulated such as B and C combinators which are combinations of the S and K combinators. A P combinator is a pairing operation and a U combinator is an "uncurry" function where a curry operation is an abstraction operation. Other combinators and their definitions are to be found in the above-referenced Turner publication.

The definitions of these various combinators serve as substitution rules by which an expression may be evaluated by progressive substitution to reduce the expression to a final result. The substitution rules then serve to form a type of compiler by which an expression to be evaluated can be translated to a machine operable code, and the present invention is directed toward a reduction processor and the operating code therefor for implementing an applicative program language of the type described by Turner.

Figure 1A:
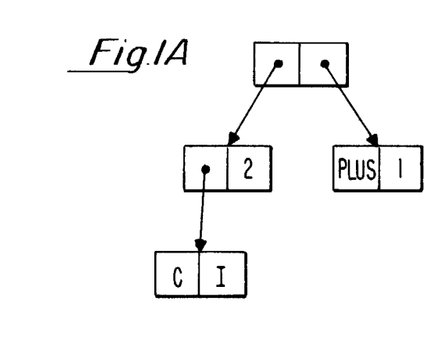
FIGS. 1A, B, C and D represent treelike graphs of the type for which the present invention is adapted.
Figures 1B, 1C:
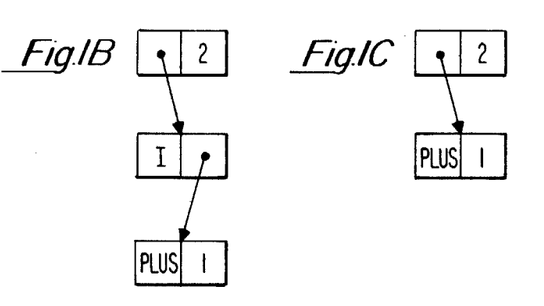

A brief example of how the reduction processor of the present invention operates is illustrated in FIGS. 1A, B, and C. This illustration is for the evaluation of the expression: successor of 2, where the successor function is defined as suc $x = 1 + x$. This compiles to the code: C12(plus 1) where the C and I are two of the combinators described above. The reduction processor of the present invention progressively transforms this expression as follows:

I(plus 1)2 using the C-rule
Plus 1 2 using the I-rule
3 using the plus rule.

Figure 1D:
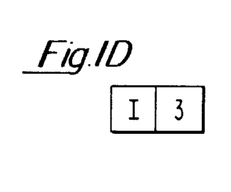

With the present invention, various programs or sequences of expressions to be evaluated are stored in memory as graphs built of two-cell nodes where each cell includes either a value or a pointer or a combinator or a primitive function. FIG. 1A shows a plurality of such cells in which the above compiled expression code is stored where the arrows represent pointers or addresses to related cells. FIG. 1B illustrates the storage cell arrangement after the first transformation given above. FIG. 1C illustrates the cell arrangement after the second transformation specified above. FIG. 1D illustrates the storage cell arrangement after the third transformation with the final result.

In this manner, incoming expressions are transformed into combinations which are stored as binary trees with nodes representing functional applications. The reduction processor of the present invention then proceeds to evaluate the expression through progressive transformations until a result is achieved. Furthermore, as was indicated above, it can be theoretically shown that different expressions can be evaluated independently or concurrently of one another so as to accommodate a network of such processors each of which may be simultaneously evaluating or executing different portions of a program or different programs.

The function of the reduction processor of the present invention is to reduce the S-K graphs of which FIGS. 1A, . . . ,D are but an example. These graphs are so referred to because of the principal substitution rules that were described above. This reduction results in a series of output values or functions. The result of a sequence of such reductions is independent of the order in which the reductions are carried out, subject to the constraint that on a given graph some reduction orders may terminate whereas others may not. Thus, the reductions normally can be performed in any order and readily lend themselves to a concurrent network of such reduction processors, one or more of which may be operating on the same graph, in which case the reduction scheme is referred to as a multi-thread reduction scheme.

The present invention uses a single-thread reduction scheme known as normal-order reduction, in which the leftmost instance of a reduction rule, present at each step, is evaluated. The reduction processor traverses left subtrees of the graph until it encounters an operator. The appropriate reduction rule is applied and the left subtree of the transformed graph is again traversed.

Figure 2A:
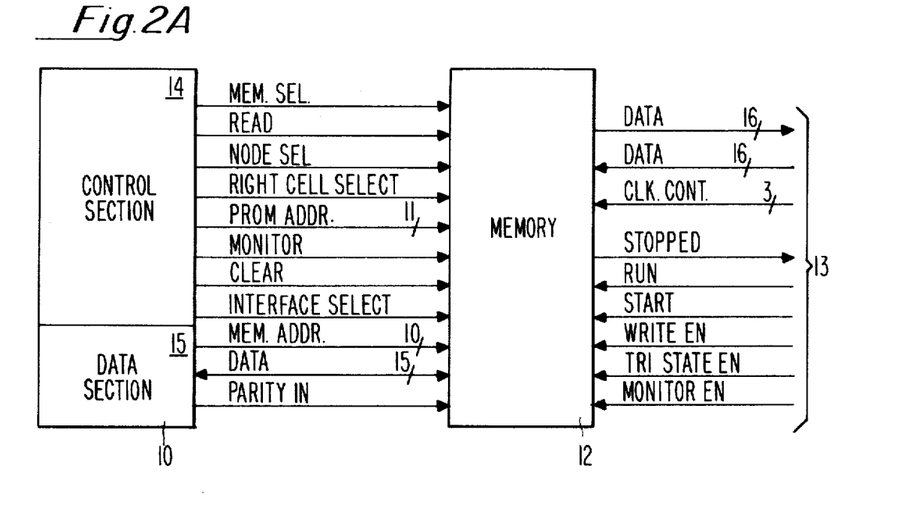
FIGS. 2A and 2B represent different embodiments of the present invention.

One embodiment of the present invention is illustrated in FIG. 2A wherein reduction processor 10 communicates with memory 11 which in turn communicates with the outside world by way of interface 13. Processor 10 consists of a control section 14 and data section 15 as will be more thoroughly described below.

Figure 2B:
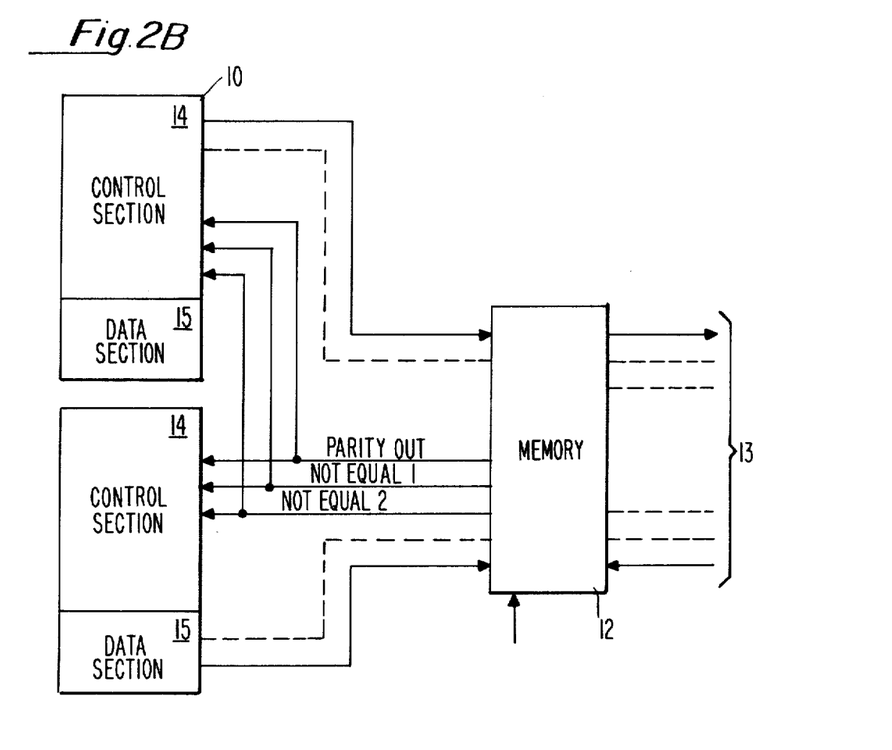

When the reduction processor of the present invention is not employed in a network of such processors, then it is desirable to employ two such processors as indicated in FIG. 2B, both of which communicate with memory 12 that in turn communicates with the outside world by way of interface 13. The function of the two processor embodiment is to allow for the monitoring of the outputs of both processors and to indicate an error if they disagree.

The function of the memory associated with each processor is to store the nodes of the graph that are to be reduced by the processor. The processor removes nodes from memory and performs various operations with them. The processor can also create new nodes in memory and delete unused ones as will be more thoroughly described below.

At any time during the process of reduction the S-K processor's node memory contains three categories of nodes. There are the nodes which compose the graph being reduced, the nodes on the "free list" (a linked list of unused nodes), and there are discarded nodes. During reduction, nodes on the free list are incorporated into the graph as needed. Other nodes and groups of nodes are detached from the graph, becoming discarded nodes. "Garbage collection" is the process of finding these discarded nodes and returning them to the free list.

There are two garbage collection schemes used in the present processor. These are the mark-scan and reference count algorithms. Mark-scan is implemented by traversing the graph and marking all reachable nodes. When the mark phase is completed, the node memory is scanned (all nodes in the memory are read). Unmarked nodes found during the scan are returned to the free list. The disadvantages of mark-scan are that the entire graph must be marked and the entire node memory must be scanned. This takes a great deal of time, causing a pause in the operation of the processor.

The reference count algorithm works by maintaining counters in each node in the graph of the number of other nodes pointing to that node. Every time a reference to a node is removed, its reference count is decremented. When the reference count is equal to zero, the node is garbage and is added to the free list. The reference count garbage collector can collect each node of garbage as it is generated, thus avoiding the pauses of the mark-scan collector. Furthermore, reference counting can do this and very little overhead. The disadvantage of the reference count scheme is that a collection of nodes may point to each other (e.g., A points to B which points to A) but are not pointed to from outside the cycle. When the last pointer into a cycle is removed, all nodes in that cycle have a reference count of at least one and so are not collected. By using mark-scan in addition to reference counting, the cycle problem can be solved. Reference counting is used until there are no more nodes on the free list, at which time mark-scan is invoked.

DETAILED DESCRIPTION OF THE INVENTION

Control Section

The control section of the reduction processor of the present invention will now be described in relation to FIG. 3. This control section responds to the various function and primitive operators to generate the control signals required to activate the various units of the processor, which control signals are stored in a microcode memory. This microcode serves to interpret the SASL language for which the present invention is adapted.

Figure 3:
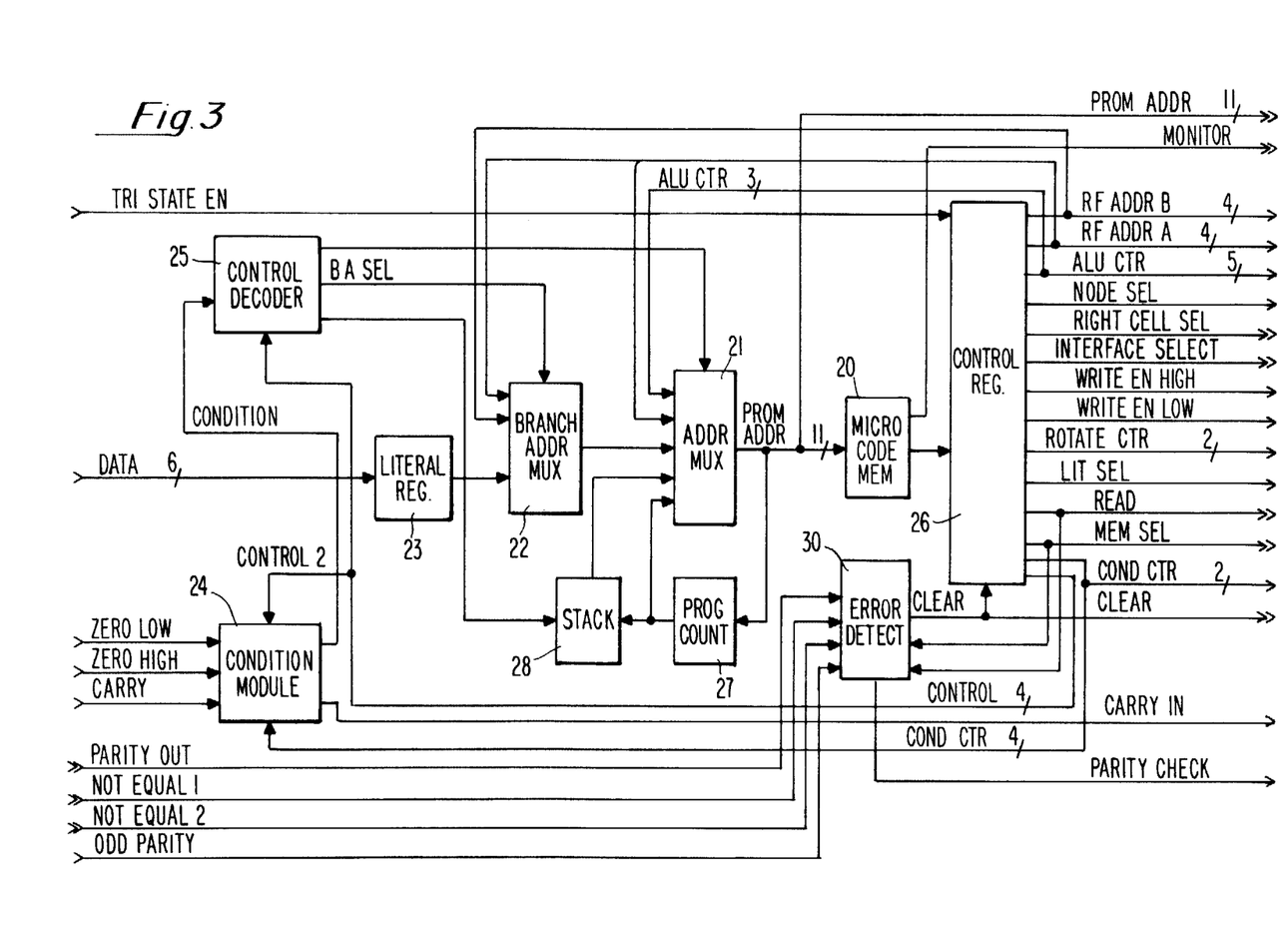
FIG. 3 is a schematic diagram of the control section of the present invention.

In FIG. 3, the heart of the control section is microcode memory 20 which stores the microcode that has been generated for the interpretation of the compiled code which makes up the various nodes of the S-K graph stored in memory 12 of FIGS. 2A and B. Microcode memory 20 may be formed of a plurality of ROMs, PROMs, or EPROMs. Such a microcode memory would normally contain 2K words of 40 bits each.

Microcode memory 20 is addressed by address multiplexer 21 which selects the microcode memory address between three possible address sources. One such source is program counter 27 which allows for sequential execution of microcode memory words. A second source is the top of stack 28 which is used for returning from subroutines and the third source is the output of the branch address multiplexer 22.

Branch address multiplexer 22 selects between two possible branch addresses. The first is a branch address literal coming from control register 26 as will be more thoroughly described below. The microcode memory address in one embodiment of the present invention is 11 bits in width. The second possible branch address is a concatenation of the output of literal register 23 (in the least significant 6 bits) and the branch address literal from control register 26 (in the most significant 5 bits). This permits a case on the value from the data section as will be described below.

Condition module 24 stores and selects the various data section conditions and is implemented with programmable array logic (PAL) and consists of a condition register and a condition multiplexer (not shown). The condition register is divided into two sections, one of which simply stores the data section conditions on each system clock. The second section controls the carry flip-flop which can be set, reset, updated or left unchanged. The CARRY IN signal from this section goes to the arithmetic logic unit of the data section as will be more thoroughly described below. The condition multiplexer selects a condition from the stored version of the various data section conditions stored in the condition register.

Other units of the control section include literal register 23 which stores 6-bit literals coming from the data section as well as stack 28 which is used to store the return address for subroutines. Stack 28 is five words deep and therefore can support five levels of subroutine nesting. Program counter 27 is a register which is loaded to each clock time with the output of address multiplexer 21 incremented by one. On a subroutine call the output of this register is pushed onto the top of stack 28.

Control decoder 25 provides the control signals for the stack 28, branch address multiplexer 22, and address multiplexer 21. These signals are created by decoding the CONTROL lines while taking the state of the select condition into account. Error detect module 30 is provided to force the processor into a reset state if there is a parity error or if, in the two-processor mode, the two processors disagree.

Control register 26 is a register which is loaded with the output of microcode memory 20 on each system clock and contains all the control signals for both the data and control sections. The control register fields are discussed below.

Microoperators

Figure 4:
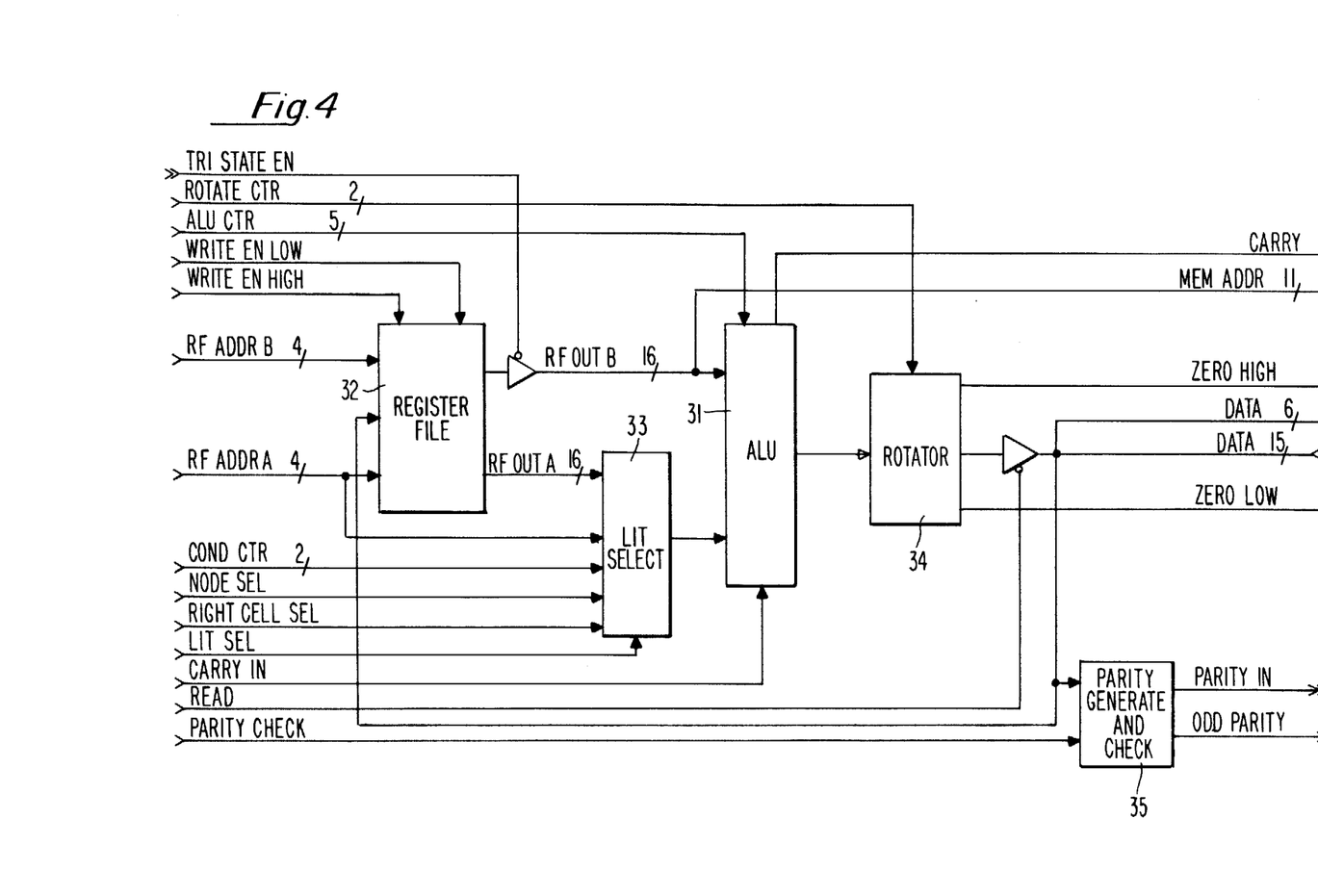
FIG. 4 is a schematic diagram of the data section of the present invention.

The microoperators are really those fields which are read out of control register 26 and will now be generally described. They include register file addresses for addressing one of the other sides of a word location in the register file 32 of the data section; write enable signals which indicate which portions of word locations in the registers file should be written into; the selection of control section literals or the output of one side of the register file as was described above in regard to the use of literals; arithmetic logic unit (ALU) controls which are described below; rotator control signals; memory selection for memory addressing and node selection; condition module controls; data literal selections; control literal selections; and branch address literal selections.

Data Section

The data section of the reduction processor of the present invention will now be described in relation to FIG. 4. This data section transfers nodes to and from memory and also stores and performs various operations as required on those nodes. The principal instrument for these operations is ALU 31 which performs all standard arithmetic and Boolean logic operations.

Register file 32 stores 16 words of 16 bits each. The most significant bit of the word has no logical use. However, it must be considered when doing some operations with ALU 31. The register file has two outputs which can be separately addressed. Information to be stored in the register file uses one of these addresses. Of the two output ports of register file 32, one is always used as a main memory address. The respective halves of the register file word can be written independently or they can be written together using appropriate write enable signals.

Rotator 34 has the ability to rotate an output word from the ALU one bit in either direction. This rotation is done only on the least significant 15 bits of the word as the most significant bit is ignored. Rotator 34 also indicates if its output is equal to zero. Actually there are two zero indications, one for each half of the output word. Parity generate and check module 35 generates parity for the data being written into main memory and also checks parity for data being read from main memory.

Differences in arithmetic precision and representation often cause problems in transporting high level language programs from one machine to another. One way of circumventing this problem is to implement only variable length integer arithmetic.

In the reduction processor of the present invention, this feature can be implemented by representing numbers as lists of digits. In this manner arbitrary precision may be obtained. The algorithms required for arithmetic operations on lists are implemented in the firmware or microcode of the processor. When arithmetic is performed in this way, the processor requires only primitive hardware arithmetic capabilities. This processor is designed to support both list arithmetic and conventional scalar arithmetic. List arithmetic will be carried out using lists of 8-bit Unsigned binary integers. Scalar arithmetic will use 8-bit Two's complement integer.

Memory Interface

Figure 5:
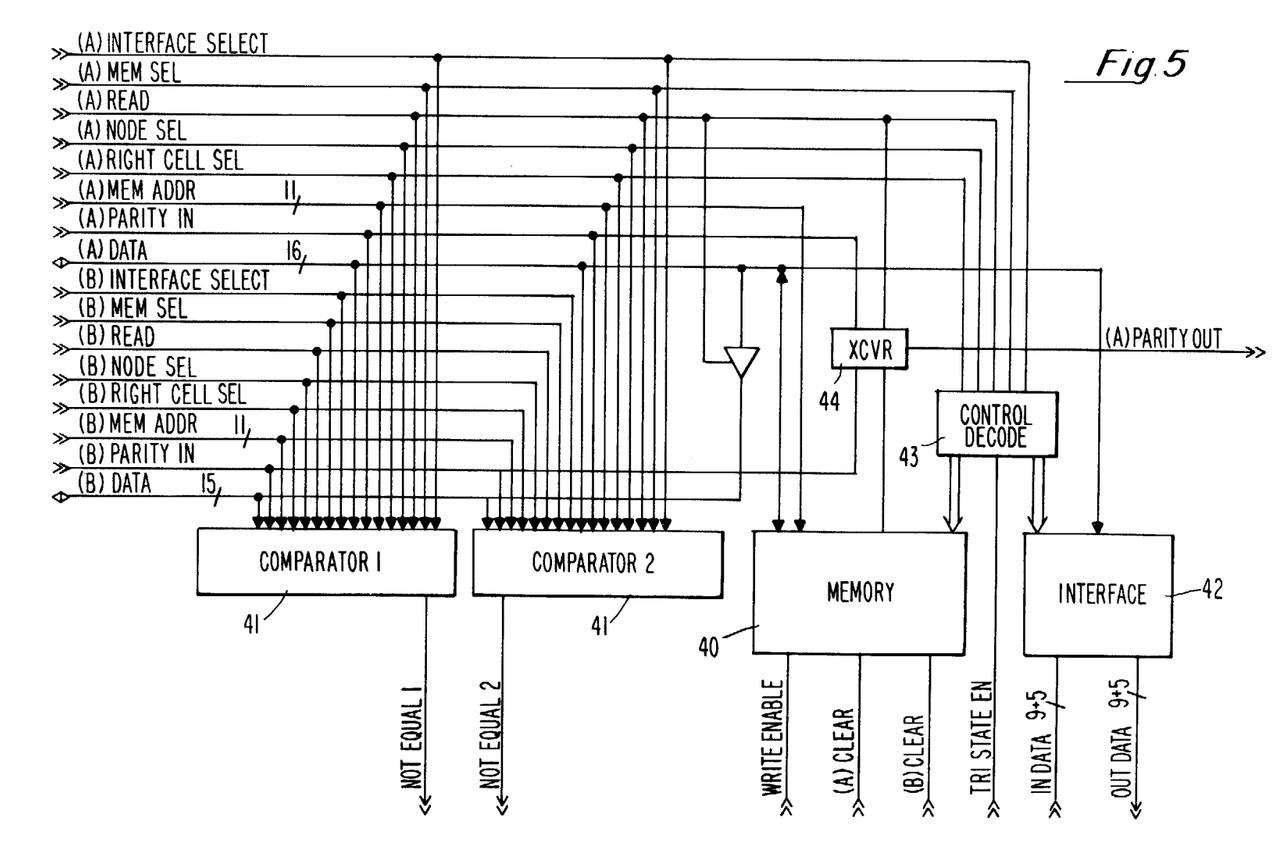
FIG. 5 is a schematic diagram of memory interface of the present invention.

FIG. 2 illustrates the memory unit of the present invention to be accessed by both the processor of the present invention and external sources. The actual memory interface is illustrated in FIG. 5. Memory 40 is accessible to receive and supply data on the bidirectional data line in response to addresses provided on the memory address line, which addresses are supplied from the register file 32 of the processor of FIG. 4. Correspondingly, data may be transferred to and from the processor and interface module 42 for the transmission to devices external to the processor and memory. The respective transfer modes of memory 40 and interface 42 are determined by control decode unit 43 in response to four control signals received from the control section of the processor. In addition, the memory interface of FIG. 5 includes comparators 41 to compare the output of two different processors when the two-processor configuration of FIG. 2B is adopted.

Node Format

Figure 6:
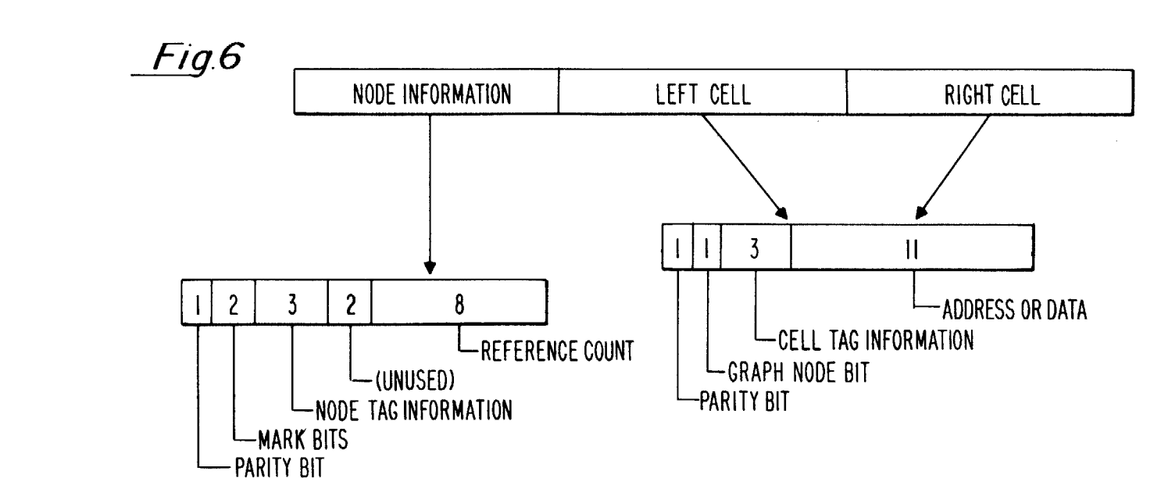
FIG. 6 is a diagram of the format of a node of the type from which such treelike graphs are formed.

The format of each node as stored in main memory is illustrated in FIG. 6. There are three fields to this node including a 16-bit node information field, a 16-bit left cell field, and a 16-bit right cell field. As indicated in FIG. 6, the respective cell fields include an 11-bit field for address or data which may be either an 11-bit address or eight bits of data preceded by a 3-bit field. The data types specified by this latter 3-bit field are Unsigned binary integer, Two's complement binary integer, Operator, EBCDIC character, Boolean, Error, or Special. The 3-bit cell tag information field specifies whether the cell is an atom or contains a pointer forward in the graph or pointers either back left or back right up the graph. In addition, the cells include a one-bit graph node bit which indicates whether the cell is contained in a functional application node or if the node information field must be consulted to find the node type.

The node information field includes an 8-bit field which is used for reference counting; a 3-bit field which specifies whether the node is a functional application node, a list node, a function node (i.e., partially reduced graph), or an arithmetic list node. In addition, there is a 2-bit mark field which indicates whether either the right cell has been marked, the left cell has been marked, both cells have been marked, or neither cell has been marked. A parity bit is also provided.

The operator codes that may be found in either of the left or right cells of the node format include all the operators representing the SASL transformations indicated above plus certain other such transformations as well as arithmetic and Boolean operations such as greater than or equal, less than or equal, AND, OR, negative, and NOT or negate.

Macroinstruction Descriptions

The principal macroinstructions will now be briefly described. Macros are a number of microinstructions which are inserted into the object code at assembly time. Macros are chosen to perform operations which are convenient for performing S-K reduction, but for which no single microinstruction exists. These macroinstructions include MOVE, STORE, and GET instructions which specify either the moving of contents from one data section register to another, storing the contents of one data section register in a node cell, or calling the contents of a node cell of a memory address contained in one data section register to be stored in another data section register.

In addition, these macroinstructions specify a Branch, Branch on Condition, Branch to a Reduction Routine for One of the Reduction Operators, Branch to a Subroutine in the Control Memory and to Store the Return Address on Top of the Stack, Branch to the Control Memory Address on the Top of the Stack for Return, Addition, Subtraction, and various Boolean operations.

EPILOGUE

A reduction processor has been disclosed above for the evaluation of one or more functions which are stored in memory in the form of a series of nodes of a treelike graph where the nodes implement a variable-free applicative language. The respective function operators are reduced through a progressive series of transformations or substitutions until a result is obtained. During the reduction process, the processor transfers nodes to and from memory and performs various operations as required on those nodes. The processor can also create new nodes in memory and delete unused ones. Difference in arithmetic precision is accodmmodated by implementing only variable-length integer arithmetic by representing numbers as lists of digits and the processor is designed to support both list arithmetic and conventional scalar arithmetic.

While but one embodiment of the present invention has been disclosed, it will be apparent to those skilled in the art that variations and modifications may be made therein without departing from the spirit and the scope of the invention as claimed.

What is claimed is:

1. A reduction processing system for executing programs stored as treelike graphs employing a variable-free applicative language code, said system comprising:

random access storage means for storing said code in the form of two-cell nodes representing different ones of said graphs, one of said cells in some of each nodes containing a storage address of another node, another of said cells in some of each nodes containing code representing a functional variable and another of said cells in some of each nodes containing a variable-free operator code specifying a function substitution; and processor means including retrieving means coupled to said random access storage means to retrieve said two-cell nodes for reduction thereof and substitution means to produce a result through execution of one or more steps of a series of said function substitutions.

2. A reduction processing system according to claim 1 including:

a data section in said processor means, said data section including register file means coupled to said storage means to receive said two-cell nodes from said storage means, upon which nodes said substitutions are to be performed.

3. A processing system according to claim 2 wherein:

said data section includes an arithmetic and logic means coupled to said register file means to perform primitive functions on the cells stored in said register file means.

4. A processing system according to claim 2 further including:

a control section in said processor means and coupled to said data section to provide control signals thereto so as to enable said substitutions to be performed.

5. A processing system according to claim 4 wherein:

said control section includes microcode memory means and a control register coupled between said microcode memory means and said data section to receive control signals stored in said microcode memory for transmission to said data section.

6. A reduction processing system for executing programs stored as treelike graphs employing a variable-free applicative language code, said system comprising:

random access storage means for storing said code in the form of two-cell nodes representing different ones of said graphs, one of said cells in some of each nodes containing a storage address of another node, another of said cells in some of each nodes containing code representing a functional variable and another of said cells in some of each nodes containing a variable-free operator code specifying a function substitution; and processor means including retrieving means coupled to said storage means to retrieve said two-cell nodes for reduction thereof and substitution means to produce a result through execution of one or more steps of a series of said function substitutions;

said substitution means including a data section having register file means coupled to said storage means to receive said two-cell nodes from said storage means, upon which nodes said substitutions are to be performed, and an arithmetic and logic means coupled to said register file means to perform primitive functions on the cells received by said register file means.

7. A processing system according to claim 6 wherein:

said arithmetic means is adapted to set a mark bit in a two-cell node whenever another two-cell node contains an address referencing said two-cell node in said storage means.

8. A processing system according to claim 6 wherein:

said arithmetic means is adapted to increment a reference count in a two-cell node whenever another two-cell node references the address of said two-cell node in said storage means.

9. In a reduction processing system having random access storage means for receiving two-cell nodes representing treelike graphs employing a variable-free applicative language code, one of said cells in some of each nodes containing a storage address of another node, another of said cells in some of each nodes containing code representing a functional variable and another of said cells in some of each nodes containing a variable-free operator code specifying a function substitution, said system also including processor means coupled to said random access storage means, the method comprising:

retrieving by said processor means, said two-cell nodes from said random access storage means; and performing one or more steps of a series of said function substitutions to reduce the applicative language code of said two-cell nodes to a result.

10. A method according to claim 9 wherein each two-cell node contains a mark bit field, said method including the steps of:

setting a bit in said mark bit field whenever another two-cell node contains an address referencing said two-cell node in said storage means.

11. A method according to claim 9 wherein each two-cell node contains a reference field, said method including the step of:

incrementing said reference field whenever another two-cell node contains an address referencing said two-cell node in said storage means.

12. A method according to claim 11 further including the step of:

decrementing said reference field whenever another two-cell node no longer contains an address referencing said two-cell node in said storage means.

* * * * *